United States Patent [19]

Beadle

[11] Patent Number: 5,718,161
[45] Date of Patent: Feb. 17, 1998

[54] BEER BREWING SYSTEM AND METHOD

[76] Inventor: Leigh P. Beadle, 375 1/2 Tenney Cir., Chapel Hill, N.C. 27514

[21] Appl. No.: 650,158

[22] Filed: May 20, 1996

[51] Int. Cl.$^6$ ............................... C12C 7/14; C12C 11/04
[52] U.S. Cl. .................. 99/276; 99/278; 426/16; 426/29
[58] Field of Search ............. 99/276, 278, 277; 426/16, 29, 592, 600, 433

[56] References Cited

U.S. PATENT DOCUMENTS

| | | | |
|---|---|---|---|
| 4,494,451 | 1/1985 | Hickey | 99/276 |
| 4,557,186 | 12/1985 | Brown | 99/278 |
| 4,801,462 | 1/1989 | Tonna | 99/278 X |

*Primary Examiner*—Reginald L. Alexander
*Attorney, Agent, or Firm*—Olive & Olive, P.A.

[57] ABSTRACT

There is provided a system for brewing beer particularly suited for a brew pub setting. The invention utilizes a cooker to heat water and a pre-blend syrup of ingredients. Once the beer mixture is boiled for a sufficient length of time in the cooker, the mixture is transferred to a brewing vessel. A spiral spray nozzle is used to add water to the brewing vessel in a conical spray pattern which causes the water to be oxygenated once it passes through the spiral spray end of the nozzle. Yeast is added to the brew mixture and oxygenated water in the brewing vessel. The beer mixture is permitted to ferment in the brewing vessel for a sufficient length of time. The fermented beer mixture is transferred to a plurality of kegs, each of which contains a mixture of sugar and gelatin. The sugar and gelatin allow the beer mixture and age and clarify. Once the beer mixture has aged a sufficient time, the beer mixture is dispensed from the kegs. The system of the invention includes a keg cleaning device for simultaneously depressurizing the keg while hooking up the device to the keg.

5 Claims, 4 Drawing Sheets

BEER BREWING SYSTEM AND METHOD

BACKGROUND OF THE INVENTION

1. Field of the Invention

This invention relates to a system and method for brewing beer, particularly a beer brewing system and method for a beer pub setting.

2. Description of the Related Art

Beer brewing systems and methods have been in existence for centuries. Modern brew systems, both large commercial systems as well as brew pub size systems, are elaborate and sophisticated, and typically require the expertise and supervision of a brew master and at least one assistant. For persons who want to produce beer for in-house use in a restaurant or brew pub, these elaborate and sophisticated systems are impractical. The brew pub brewery system of the invention provides a practical solution for such needs.

The beer brewing system and method of the current invention simplifies and streamlines the elaborate beer brewing systems currently used, and requires only one operator who need not be specially skilled in beer brewing.

It is therefore an advantage of this invention to provide a simplified and streamlined beer brewing system and method.

A further advantage of this invention is that it provides a method for brewing beer which does not require either the expertise of a brew master or an elaborate, sophisticated brewing system.

A still further advantage of this invention is that it provides a method and system for brewing beer which is less costly and easier to manage so that a greater number of restaurateurs can offer on-site brew pubs in their establishments.

Other advantages will be more fully apparent from the following disclosure and appended claims.

SUMMARY OF THE INVENTION

The present invention is directed to a system and method for brewing beer that satisfies the need for a simplified and streamlined brew pub brewery system particularly suited for a typical restaurant brew pub setting. The invention in its most basic form, provides a three-stage system for brewing beer comprising a cooker/pump assembly, a brewing vessel and storage kegs. The cooker/pump assembly has a heater capable of warming the contents of the cooker in which a pre-blend syrup and water are mixed and heated to boiling and capable of pumping fluid from the cooker/pump assembly. The brewing vessel has a tank portion comprising a top surface and a cylindrical side wall, and a slanted bottom surface, a top aperture and a man-way formed in the top surface, a draw-off valve extending from the side wall near the bottom of the tank portion from which the contents of the vessel above any sediment layer can be drawn, and a drain extending from the bottom surface of the vessel through which the entire contents, particularly sediment can be drained from the vessel, the vessel being connectable to the cooker/pump assembly so that the contents of the cooker are line-fed from the cooker to the brewing vessel through the man-way. The brewing vessel also has a hollow elbow pipe having an opening at one end and a nozzle at an opposite end, the elbow pipe being generally formed in a right angle and mounted in the top aperture of the vessel such that the nozzle extends into the vessel interior, for introducing pressurized fluid into the vessel in a conical spray pattern to cause the fluid to contact the tank interior, and such that when pressurized water passes through the nozzle into the vessel, the water is aerated, and wherein the nozzle also acts as a pressure relief aperture from which gas produced inside the vessel is expelled. The beer brewing system of the invention also comprises a plurality of kegs, each keg separately connectable to the draw-off valve of the brewing vessel by a draw line so that fluid from the brewing vessel is gravity fed from the vessel into the kegs. The beer brewing system further comprises a water trap attachable to the elbow pipe of the tank to permit gas to be released from the tank and to prevent atmospheric gas to re-enter the tank interior.

An additional feature of the invention is a keg cleaning device having a flexible draw line for carrying fluid from a pressurized fluid source to an on-off valve which in a first position permits fluid to pass down-line through the valve and in a second position prevents fluid from passing through the vane; a rigid spray wand connectable at a first end to the draw line down line of the on-off valve, and a second opposite end having a spray nozzle for spraying fluid from the pressurized fluid source, through the draw line and through the wand into the keg to be cleaned; and a flexible tap line connected at a first end to a keg tap for connecting onto the keg, and connected at a second opposite end to the spray wand at a position down line of the on-off valve, such that when the keg tap is connected to the keg and the tap line any pressure contained by the keg is released through the keg tap and tap line.

Other aspects and features of the invention will become apparent from the following disclosure and appended claims.

DETAILED DESCRIPTION OF THE INVENTION AND PREFERRED EMBODIMENTS THEREOF

The present invention relates to a simplified and streamlined brew pub brewery system and method, comprising, respectively, a unique combination of equipment and a series of steps which when utilized contribute to improved beer brewing. A typical beer brewing system known in the art will first be described.

Figure 1:
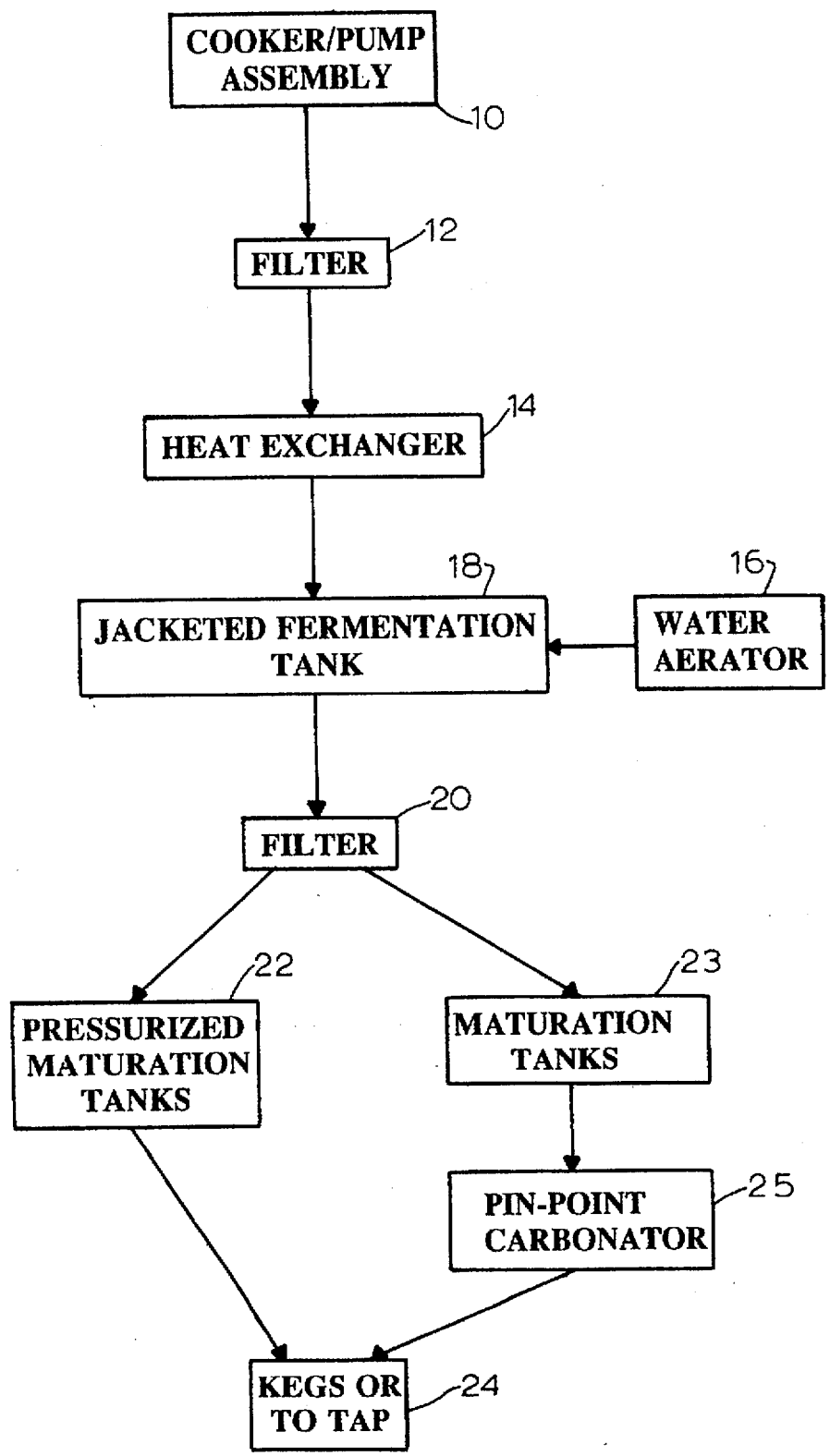
FIG. 1 is a block diagram representing a typical prior an brewing system.

FIG. 1 is a schematic drawing of a typical brewing system to illustrate the complexity and extensive nature of such a system. In such a system, as a first step, the ingredients of a brew mix, that is, hops, corn, malt and water, are mixed together and heated to boiling in cooker/pump assembly 10, which is a heated tank. The mixing of the ingredients at this point typically requires the expertise of a skilled brew master because the beer flavor is created at this stage and is continually tested and modified until the desired flavor is achieved. After sufficient boiling, the mixture is then pumped from cooker/pump assembly 10 into a filter 12 in which residue from the hops is removed from the mixture. Some systems use a whirlpool centrifuge unit to remove the hops residue; other systems use a complex filter apparatus. The hot mixture after leaving filter 12 is run through a heat exchanger 14 to reduce the temperature of the mixture from boiling to approximately 40° F. to 50° F. Some heat exchangers 14 are equipped with a glycol chiller (not shown). If the temperature is not reduced, it is commonly believed by those in the trade that the yeast which must be added to the mixture will not react properly, but will be killed by the hot temperature of the mixture.

The cooled mixture is then transferred into a jacketed fermentation tank 18. For healthy fermentation by the yeast, the yeast requires oxygenated or aerated water. Water aerator 16 is typically a separate unit in which water is aerated by introduction of pressurized oxygen. Once aerated the water is pumped into tank 18. In fermentation tank 18, the mixture is added to aerated water, yeast is added, and the mixture is permitted to ferment in tank 18. In order to control the temperature of the mixture during fermentation such that it will remain at approximately 40° F. to 50° F., tank 18 is typically double walled and has a glycol chiller. In this manner, the temperature of the fermentation process is controlled so that the temperature does not become too high during fermentation to destroy the yeast. Sometimes brew systems locate fermentation tanks 18 in a chilled room to maintain the temperature in this range. Once the mixture has fermented, it is filtered in a filter 20 to remove the spent hops and any remaining yeast. Filter 20 is typically a very sophisticated arrangement of leaf filters which serve to clarify the fermented beer mixture. Finally, the mixture is pumped typically into either pressurized maturation tanks 22 or into unpressurized maturation tanks 23. In pressurized maturation tanks 22, the mixture matures and is carbonated. Once matured, the final beer product is stored in tanks 22 until transferred to either a tap or kegs 24. Unpressurized maturation tanks 23 are used to mature and store beer. Once matured in tanks 23, the beer is first passed through a separate pin-point carbonator 25 to carbonate the beer mixture before it is transferred to a tap or kegs 24.

It can be seen from the foregoing description that brewing beer in this manner is a complex and sophisticated process which generally requires the expertise and supervision of a brew master and at least one assistant. Additionally, the equipment necessary for a typical brew system is extraordinarily expensive and requires a tremendous amount of facilities space. As shown schematically in FIG. 1, a typical brewery system requires two filter units, a heat exchanger, a glycol chiller (or other significant method for controlling the fermentation temperature), a complex water aerator, and specialized maturation tanks. These components are essentially eliminated by the beer brewing system and method of the present invention and thus the invention particularly lends itself to a brew pub brewery.

Figure 2:
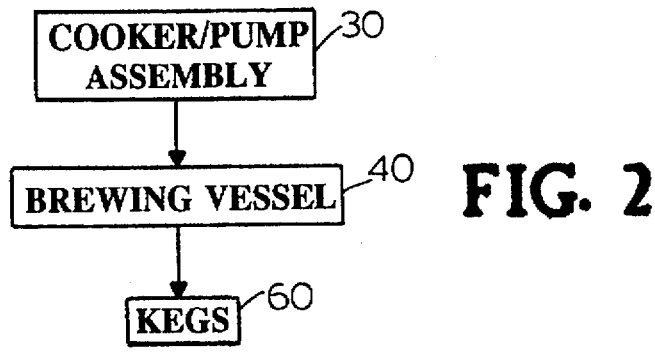
FIG. 2 is a block diagram of the brew pub brewery system of the invention.

In the system and method of the invention, much of the equipment and personnel expertise required by known brewing systems is eliminated, thus streamlining and simplifying the system and the method for brewing beer. In its most basic form as shown in block diagram in FIG. 2, the invention comprises as its main elements cooker/pump assembly 30, brewing vessel 40 and kegs 60. The invention recognizes that a pre-blend syrup successfully provides the flavor for the final beer product and can be used in the system and method of the invention. Additionally, the invention recognizes that the fermentation process can occur successfully without cooling the fermentation environment. The successful use of this discovery in a commercial brewery contradicts the common understanding in the brew industry which undertakes elaborate methods to keep the brewing temperature, after the initial boiling, to between 40° F. to 50° F. As a result of the use of this discovery in the invention, the brew system and method are significantly simplified and streamlined as compared to typical commercial beer brewing.

The brew system and method of the invention describes a system and method which is particularly suitable for an average size brew pub setting. It is to be understood that equipment capacity and the ingredient amounts can be altered depending on the output volume desired by the owner of the system. The amounts described below are thus examples and are suitable for obtaining a final yield of approximately 20 kegs.

First, approximately 35 gallons of water are introduced into cooker/pump assembly 30 and brought to a boil. Then, approximately 25 gallons of pre-blend syrup are introduced to the boiling water in cooker/pump assembly 30. The pre-blend syrup is a mixture of malt, tom and hops. The amounts of the ingredients in the pre-blend syrup vary according to the beer and flavor desired, such as end pilsner, red ale, or bock dark. Once the pre-blend syrup is added and dissolved, the mixture is brought to boiling temperature and allowed to boil for approximately one to ten minutes. The boiling time varies according to the flavor chosen and desired for the final beer product. A suitable cooker for cooker/pump assembly 30 is available in the market. One suitable cooker is a 90-gallon capacity cooker available from Old Hickory BBQ, Godwin, North Carolina identified as SPI#1. The pump portion of cooker/pump assembly 30 comprises a standard stainless steel centrifugal 1 hp pump. A suitable pump is of the type available from Thomsen of Kenosha, Wis. 53410 as Model No. 5.

Once the mixture has boiled a sufficient time, the mixture is pumped through a feed line (not shown) from cooker/pump assembly 30 into tank 42 of brewing vessel 40 through man-way 48. Brewing vessel 40 (FIG. 5) is uniquely adapted for use in the brew pub brewery system and method of the invention, and is considerably less expensive than typical beer brewing fermentation equipment. In structure, brewing vessel 40 is a single-wall tank, having a top surface, a bottom surface and a cylindrical side wall to form tank 42. The bottom portion of vessel 40 has draw-off valve 50 from which brew mixture from vessel 40 is drawn, and drain 52 through which the contents of tank 42 may be drained. The bottom surface of vessel 40 is slightly slanted or bent in an amount sufficient to permit the tank to be fully drained, but not so severely slanted to permit yeast resting on the top surface of the mixture in the tank to gravitate to draw-off valve 50. The top surface of vessel 40 has a see-through opening 49, man-way 48, and top aperture 44. As previously described, brew mixture from cooker/pump assembly 30 is pumped through man-way 48 into tank 42. Man-way 48 also permits personnel to access the inside of brewing vessel 40 if necessary. See-through 49 permits operators of the system to view the contents of vessel 40.

Top aperture 44, located on the top and centrally of brewing vessel 40, receives elbow pipe 45 and nozzle 46. Elbow pipe 45 is preferably a solid stainless steel hollow tube forming generally a right angle having a first open end 43 and a second opposite end 47 installed by being welded or threadably secured in the top of brewing vessel 40 in top aperture 44 to form a passageway from the interior of tank 42 to the outside of vessel 40. Nozzle 46 is rigidly attached, preferably by welding to second end 47 of elbow pipe 45 such that when elbow pipe 45 is mounted on vessel 40, nozzle 46 extends into tank 42.

Nozzle 46 is typically sold for the purpose of providing a means for establishing a spray within a tank for cleaning the interior surfaces of the rank, and is therefore often called a clean-in-place (CIP) device. Applicant has discovered and recognized, however, that this same type of nozzle for purpose of the invention can serve as a water aerator, a pressure relief, and a clean-in-place unit. Nozzle 46 forms a hollow, tapered spiral structure, which produces a conical spray pattern when pressurized fluid is permitted to pass through the nozzle. Nozzle 46 has no internal parts. Because of its structure and the type of spray pattern produced, water which passes through nozzle 46 is aerated. Nozzle 46 acts as a type of free atomizer. It is a particularly unique feature of the invention to utilize nozzle 46 as a water aerator for providing aerated water to the brew mixture in the brewing vessel. As previously described, in known brewing systems a separate piece of equipment, an aerator or oxygenator is attached to the fermentation tank to provide the aerated water required by the yeast. These types of devices are typically very expensive. Nozzle 46 is also used in its normal manner as a CIP nozzle to introduce cleaning fluid into the interior of tank 42. As also described below, nozzle 46 acts as a pressure relief for tank 42. As gas is produced in tank 42 during the fermentation process, it is permitted to escape from tank 42 through the hollow center of nozzle 46. Thus, nozzle 46 performs three functions in vessel 40: it acts as a water aerator, it serves as a pressure relief, and it can also serve as a CIP device. The simplicity of the structure of nozzle 46 and the uncomplicated manner in which it is attached to brewing vessel 40 makes nozzle 46 particularly advantageous in simplifying and streamlining the method and system of the invention and particularly when applied as a brew pub brewery.

Nozzle 46 is capable of producing a variety of spray pattern angles, for example in the range of 50 to 170 degrees, measuring the arc of the conical pattern produced. Nozzle 46 preferably produces a 170 degree angle so that water aeration is maximized and the contact area of the spray to the interior surfaces of tank 42 is also maximized. A suitable nozzle 46 is available from Bete Fog Nozzle, Inc. of Greenfield, Mass. 01302 and designated by model number TF20-170.

Figure 3:
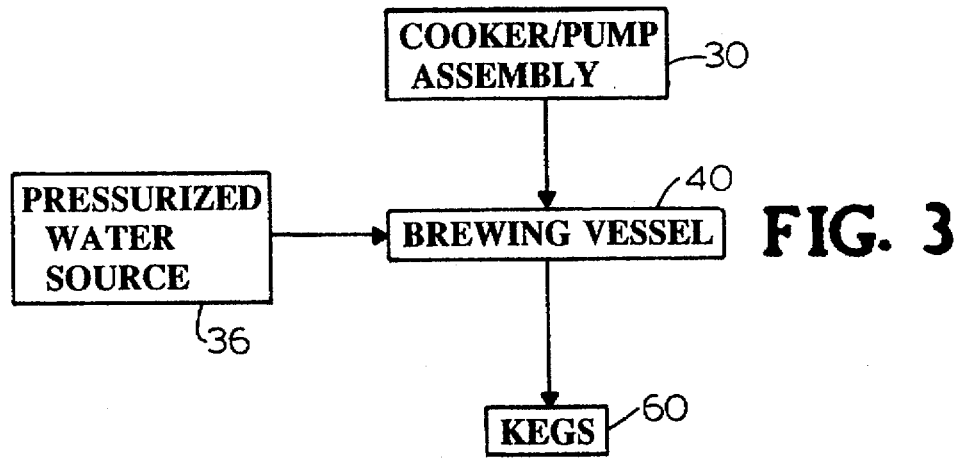
FIG. 3 is a block diagram of the brew pub brewery system of FIG. 1 showing a pressurized water source connected to the brewing vessel.
Figure 4:
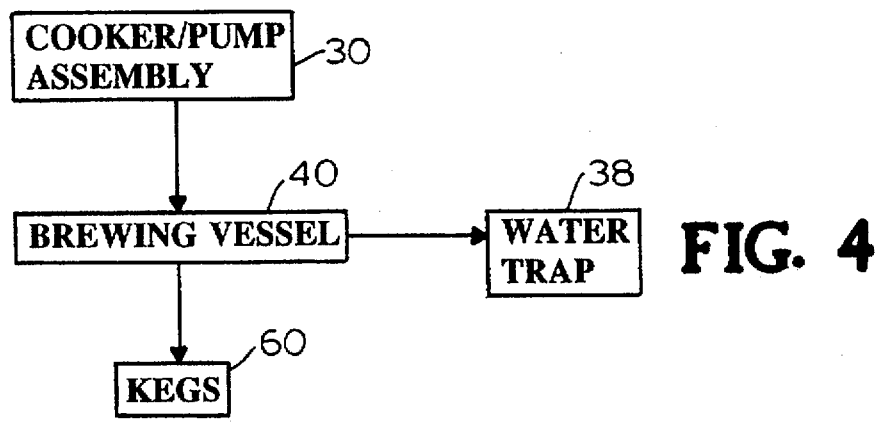
FIG. 4 is a block diagram of the brew pub brewery system of FIG. 1 showing a water trap connected to the brewing vessel, and replacing the pressurized water source shown in FIG. 3.
Figure 5:
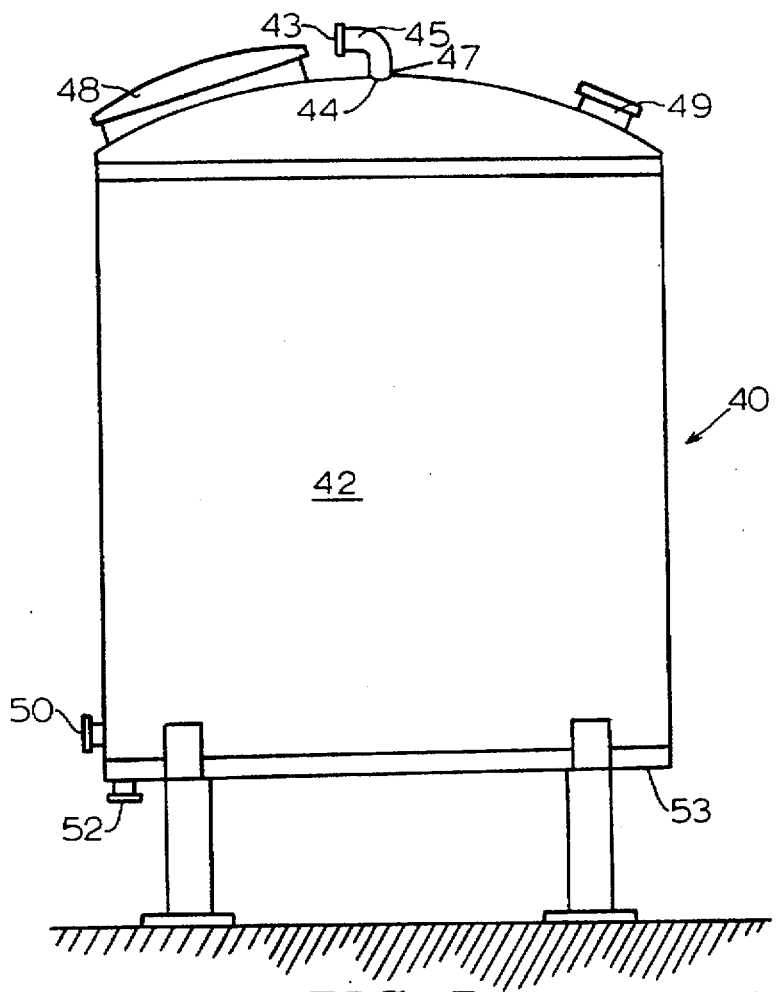
FIG. 5 is an elevation view and more detailed view of the brewing vessel depicted in FIG. 2.
Figure 6:
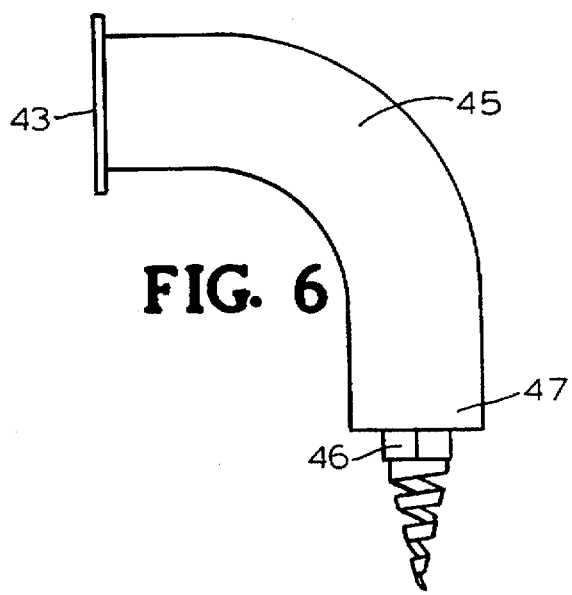
FIG. 6 is an elevation view of an elbow pipe and nozzle which attaches to the brewing vessel of FIG. 5.
Figure 7:
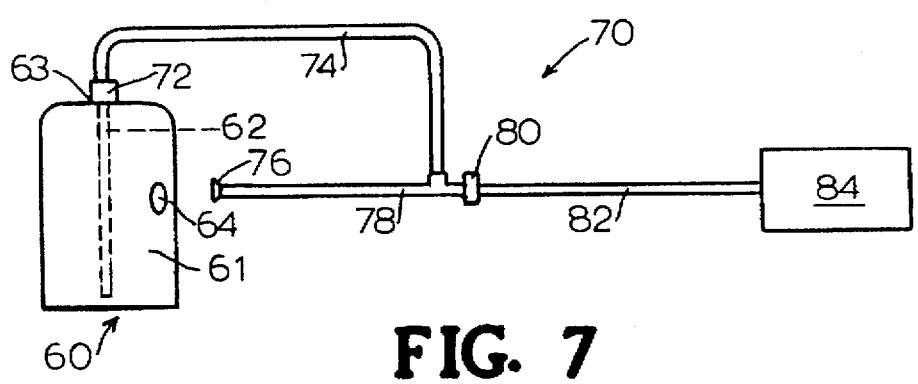
FIG. 7 is a schematic diagram of a keg cleaning apparatus useful as part of the invention system.

As shown schematically in FIG. 3, 5 and 6 water is taken from a pressurized water source, such as municipal tap water, and line fed into first end 43 of elbow pipe 45 and through nozzle 46 into tank 42. The water is aerated as is passes through nozzle 46. Approximately 250 gallons of aerated water are introduced into brewing vessel 40 prior to the transfer of the boiled mixture from cooker/pump assembly 30. After aerated water is introduced into vessel 40, water trap 38 is attached to elbow pipe 45, as shown schematically in FIG. 4. The resulting mixture in vessel 40 has a temperature of approximately 80° F. to 85° F. Approximately one cup of yeast is then added to the mixture. Although this temperature is believed to be too high to successfully activate yeast, the invention recognizes that yeast, especially a high-temperature yeast of the type available from Mauri Foods of Toowoomba, Queensland, Australia 4350 under the trade name MAURI-BREW, effectively causes fermentation. The mixture is then permitted to ferment for approximately three to five days. During this process, much of the sediment in the mixture sinks to the bottom of tank 42. A layer of yeast may rest on the top of the beer mixture but will not be removed from tank 42 because draw-off valve 50 from which the beer mixture is drawn draws beer mixture from below the yeast layer. In this manner, much of the undesired by-product of the beer brewing process is removed from the beer mixture, thus eliminating the need for an elaborate filter apparatus commonly required by known brew systems.

During the fermentation process, water trap 38 permits the escape of the carbon dioxide which is produced during the fermentation process. A simple water trap 38 well known in the art comprises in one form a hollow tube, such as a polyvinyl carbonate (PVC) tube (not shown) attached at a first end to the first end 43 of elbow pipe 45, and having an opposite end which is submerged in a container of water. Gas which escapes from tank 42 through nozzle 46, pipe 45 and the PVC tube, bubbles through the water in the water trap and no air is permitted to re-enter tank 42.

Once the mixture is sufficiently fermented, the fermented mixture is drawn from tank 42 from draw-off valve 50 by gravity feed and transferred into kegs 60 in which the fermented mixture carbonates and ages. Mixture taken from tank 42 at draw-off valve 50, which is located approximately two inches above the bottom surface of vessel 40, is free from much of the sediment in the mixture which will have settled at the bottom of vessel 40. Sediment, and the like, is removed from brewing vessel 40 through drain 52.

A mixture of sugar and gelatin is prepared and introduced into kegs 60 which carbonates and clarifies the beer mixture. For one keg 60, approximately 0.5 ounces of gelatin and approximately one and one-half cups of sugar is prepared. Gelatin is a natural clarifying agent which causes sediment in the beer mixture to settle in the keg. The sugar causes the beer mixture to carbonate. In this manner, the beer mixture is clarified, thus eliminating the need for a complex filter apparatus commonly used in known brew systems. The beer mixture is permitted to age in kegs 60 for approximately two weeks at room temperature. Once the beer mixture has aged, kegs 60 are ready to be tapped for dispensing the final beer product in the manner well known in the art.

An additional feature of the invention which enhances use of its novel system and method is to provide a unique keg cleaning device. A typical keg, represented by keg 60, comprises barrel 61, tap aperture 63 for receiving a tap device for dispensing beer from keg 60, bung hole 64 formed in the side wall of barrel 61, bung plug (not shown) which conforms to the size and shape of bung hole 64 to seal hole 64, and down tube 62. It is often a difficult task to properly clean keg 60. A typical brew pub keg cleaning system is extremely complicated and expensive. Both the down tube and the interior of keg 60 must be properly cleaned. One difficult task is to properly clean down tube 62. An inexperienced operator is very likely to forget to, or insufficiently, clean down tube 62, in which case bacteria may form and contaminate beer product in keg 60. A second danger in keg cleaning is the safe removal of the bung plug from bung hole 64 so that the interior of keg 60 can be accessed for cleaning. A keg 60 which has been drained of beer product is, or at least may be, still under pressure. Accidental removal of bung plug from hole 64 when keg 60 has not been depressurized can cause serious damage because of the force with which the bung plug may be expelled from keg 60. Therefore, it is of utmost importance and from the safety viewpoint of to depressurize keg 60 before removing the plug. An inexperienced operator may very easily forget this step.

Keg cleaning device 70 generally comprises tap 72, rigid spray wand 78 having spray nozzle 76 and pressurized fluid source 84. The pressurized fluid source can be a municipal water tap or a cleaning solution which is pumped through the centrifugal pump of cooker/pump assembly 30. Pressurized fluid source 84 is attached to a first end of flexible draw line 82 of keg cleaning device 70. At a second opposite end of line 82 is on-off valve 80 which controls the flow of fluid through device 70. At a position down line to on-off valve 80, wand 78 is attached at a first end to line 82 and has at a second end a spray nozzle 76 for inserting and emitting spray into the interior of barrel 61 for cleaning. Flexible tap line 74 is attached at one end to tap 72, and at an opposite end to wand 78, in a position down line of on-off vane 80. It is an advantage of keg cleaning device 70 of the invention to simultaneously depressurize keg 60 during the attachment of keg cleaning device 70 to keg 60. Tap 72 is a tap normally available on the market except that the check valve inside tap 72 is removed. Because the check valve is removed from tap 72, when tap 72 is attached in normal fashion to tap aperture 63, pressure is immediately released from the interior of keg 60 through tap 72. In operation, tap 72 is attached to tap aperture 63 to immediately depressurize keg 60. The bung plug is then removed from bung hole 64. On-off valve 80 is operated to permit flow of fluid through device 70. Spray nozzle 76 is inserted into bung hole 64 to clean the interior of keg 60. Simultaneously, fluid is passing through tap line 74 and into keg 60 through down tube 62 thereby simultaneously cleaning down tube 62. Whether fluid is passing through the device 70 or not when tap 72 is attached to tap aperture 63, the pressure will be released from keg 60 and the bung plug can be safely removed. If fluid is passing through device 70 the pressure released will be forced back into the interior with the fluid flow.

The brew system and process of the invention recognizes that the entire brewing process successfully occurs at room temperature without the need for added specialized centrifuges or filters, cooling jackets or heat exchangers, or specialized pressure relief valves. The brew pub brewery system of the invention occupies considerably less space and is considerably less expensive than known brew systems. It is estimated that the brew system of the invention costs approximately ten times less than typical brew systems that are currently known.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A beer brewing system comprising:
  a. a cooker/pump assembly having a cooker with a heater capable of warming and bringing to boil a pre-blend syrup and water mix and a pump capable of pumping fluid from the cooker;
  b. a brewing vessel having a tank comprising a top surface, a cylindrical side wall, a slanted bottom surface, a top aperture, a man-way formed in the top surface, a draw-off valve extending from the side wall near the bottom of the tank from which the contents of the vessel above any sediment layer can be drawn, and a drain extending from the bottom surface of the vessel through which the entire contents, particularly sediment can be drained from the vessel, the vessel being connectable to the cooker/pump assembly in a manner which enables the contents of the cooker to be line-fed from the cooker to the brewing vessel through the man-way;
  c. a hollow elbow pipe-nozzle assembly having an elbow pipe with an opening at one end and a nozzle at an opposite end, said elbow pipe being generally formed in a right angle and mounted in said top aperture of the vessel such that the nozzle extends into the vessel interior, said elbow pipe-nozzle assembly being operative as a means for introducing pressurized fluid into the vessel in a conical spray pattern to cause the fluid to contact and clean the tank interior, also being operative when pressurized water passes through the nozzle into the vessel to serve as a means for aerating such water, and also being operative for service as a pressure relief aperture through which gas produced inside the vessel may be expelled; and
  d. a plurality of kegs, each keg being separately connectable to said draw-off valve of the brewing vessel by a draw line enabling fluid from the brewing vessel to be gravity fed from the vessel into the kegs.

2. The beer brewing system of claim 1 further comprising a water trap attachable to said elbow pipe to permit gas to be released from said tank and to prevent atmospheric gas to re-enter the interior of said rank.

3. The beer brewing system of claim 1 further comprising a keg cleaning device, comprising:
  a. a flexible draw line for carrying fluid from a pressurized fluid source to an on-off valve which in a first position permits fluid to pass down-line through the valve and in a second position prevents fluid from passing through the valve;
  b. a rigid spray wand connectable at a first end to the draw line of the on-off valve on a downline side thereof, and having a second opposite end with a spray nozzle arranged for spraying fluid from the pressurized fluid source, through the draw line and through the wand into the keg to be cleaned; and
  c. a flexible tap line connected at a first end to a keg tap through which a connection is made to the keg having said tap, and connected at a second opposite end to said spray wand at a position down line of the on-off vane, such that when the keg tap is connected to said keg any pressure contained by the keg is released through the keg tap and tap line.

4. A method for brewing beer comprising the steps of:
  a. introducing water to a cooker in an amount sufficient to dissolve a pre-determined amount of pre-blend syrup;
  b. bringing to boiling the water in the cooker;
  c. adding a said predetermined amount of said pre-blend syrup to boiling water in the cooker;
  d. permitting the pre-blend syrup to dissolve in the boiling water and bringing the dissolved pre-blend and water mixture to boiling;
  e. boiling the pre-blend and water mixture from one to ten minutes;
  f. introducing oxygenated water into a brewing vessel;
  g. transferring the boiled pre-blend and water mixture from the cooker into the brewing vessel containing the oxygenated water;
  h. adding yeast to the mixture in the brewing vessel to permit fermentation;
  i. permitting the mixture to ferment for approximately three to five days;
  j. introducing a mixture of sugar and gelatin into a beer keg;
  k. transferring a portion of the fermented mixture into the beer keg;

l. permitting the fermented mixture to react with the sugar and gelatin in the keg for approximately two weeks to permit the mixture to carbonate and the sediment to settle in the bottom of the keg; and m. dispensing the aged beer from the keg.

5. A beer brewing system comprising:

a. a cooker/pump assembly having a cooker with a heater capable of warming and bringing to a boil a pre-blended fermentable syrup and water beer mix and a pump capable of pumping fluid from the cooker;

b. a brewing vessel assembly comprising:
  i. an integrally formed tank comprising:
    (1) a top wall;
    (2) a side wall;
    (3) a bottom wall; and
    (4) a man-way formed in the top wall;
  ii. a draw-off valve extending from the side wall and located above the bottom wall at a position permitting withdrawal of the contents of the vessel above any sediment layer;
  iii. a drain extending from the bottom wall and positioned so as to permit the entire contents of the vessel, particularly sediment, to be withdrawn; and
  iv. means connectable to the cooker/pump assembly in a manner which enables the contents of the cooker to be line-fed from the cooker to the vessel through the man-way;

c. a hollow pipe-nozzle assembly having a pipe with an opening at an upper end extending above said top wall and a nozzle secured to and mounted on an opposite lower end, positioned in said top wall centrally of said vessel, said nozzle being mounted so as to extend into the vessel interior and formed so as to spray fluid impinged thereon in a conical spray pattern; and d. said pipe-nozzle assembly being operative:
  i. as a means utilizing said nozzle for introducing pressurized fluid into the vessel in a conical spray pattern to cause the fluid to contact and clean the tank interior;
  ii. as a means utilizing said nozzle for aerating said pressurized fluid; and
  iii. as a pressure relief aperture through which gas produced inside the vessel may be expelled through the passage extending through said pipe-nozzle assembly; and e. at least one keg-like container suited to aging beer produced in said brewing vessel and withdrawn through said draw-off valve.

* * * * *

UNITED STATES PATENT AND TRADEMARK OFFICE
CERTIFICATE OF CORRECTION

PATENT NO. : 5,718,161
DATED : February 17, 1998
INVENTOR(S) : Leigh P. Beadle

It is certified that error appears in the above-indentified patent and that said Letters Patent is hereby corrected as shown below:

Column 2, line 35, correct "an" to read --art--.

Column 4, line 26, correct "tom" to read --corn--.

Column 5, line 10, correct "rank" to read --tank--.

Column 6, line 65, correct "safety viewpoint of" to read --viewpoint of safety--.

Claim 3(c), line 4, correct "vane" to read --valve--.

Signed and Sealed this

Twenty-eighth Day of April, 1998

Attest:

BRUCE LEHMAN

Attesting Officer

Commissioner of Patents and Trademarks